US007366314B2

(12) United States Patent
Corley et al.

(10) Patent No.: US 7,366,314 B2
(45) Date of Patent: Apr. 29, 2008

(54) SPEAKER CLEARANCE ARRANGEMENT FOR A COMMUNICATION DEVICE

(75) Inventors: Cortez Corley, Waterloo (CA); Frank Tyneski, Kitchener (CA); Norman Ladouceur, Waterloo (CA); Larry Hawker, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 574 days.

(21) Appl. No.: 10/856,806

(22) Filed: Jun. 1, 2004

(65) Prior Publication Data

US 2005/0265567 A1 Dec. 1, 2005

(51) Int. Cl.

| | |
|---|---|
| ***H04M 1/00*** | (2006.01) |
| ***H04R 9/06*** | (2006.01) |
| ***H04R 1/02*** | (2006.01) |

(52) U.S. Cl. ...................... 381/311; 381/334; 381/386; 381/333; 381/336; 455/569.1; 455/575.1; 455/575.8; 379/454; 379/455; 379/446

(58) Field of Classification Search ................. 381/87, 381/311, 333, 334, 336, 91, 122, 345, 182, 381/374, 375, 385–388, 391, 395, 189; 224/929, 224/930; 455/550.1, 556.2, 566, 569.1, 569.2, 455/575.1, 575.6, 575.8; 378/454, 446, 455
See application file for complete search history.

(56) References Cited

U.S. PATENT DOCUMENTS

| | | | | |
|---|---|---|---|---|
| 5,661,798 | A | 8/1997 | Chen et al. | |
| 6,321,070 | B1 * | 11/2001 | Clark et al. | 455/575.1 |
| 6,405,910 | B1 | 6/2002 | Infanti et al. | |
| D499,722 | S * | 12/2004 | Widiaman | D14/248 |
| 7,190,968 | B2 * | 3/2007 | Nakamura | 455/550.1 |

FOREIGN PATENT DOCUMENTS

| | | |
|---|---|---|
| DE | 8903173 | 5/1989 |
| DE | 29713766 | 9/1997 |
| EP | 1301013 | 4/2003 |
| EP | 1301013 A1 * | 4/2003 |

* cited by examiner

*Primary Examiner*—Wayne Young
*Assistant Examiner*—Dionne Pendleton
(74) *Attorney, Agent, or Firm*—McCarthy Tétrault LLP

(57) ABSTRACT

Disclosed is an enclosure for a speaker for a communication device. The enclosure comprises: a surface; a speaker grill located in the surface, the grill having an opening therein providing an air channel to the speaker; and at least one structure located in a first region in the surface and protruding from the surface. The enclosure is shaped such that when the enclosure is placed on a flat surface with the surface facing the flat surface, the structure causes the surface to be canted from the flat surface to expose the speaker grill to ambient air.

7 Claims, 9 Drawing Sheets

SPEAKER CLEARANCE ARRANGEMENT FOR A COMMUNICATION DEVICE

FIELD OF INVENTION

The invention relates to a system for enhancing audibility of signals generated by a communication device, such as a cellular phone.

BACKGROUND

A typical voice communication device, such as a cellular phone, has a receiver (speaker) located at a top portion of the device and a transducer (microphone) located at a bottom portion. A user of the device generally holds and orients it by a side of his head such that the speaker is near his ear and the microphone is near his mouth.

Additionally, the device may have hands-free functionality. One implementation of the hands-free functionality is to have a speaker located on the back of the device. However, when that device is placed on a hard flat surface like a desktop, the surface blocks the speaker and the sound from the speaker is muted and muffled.

A smaller device, such as a tiny cellular phone, has a rounded back, such that the back does not sit flat against the surface, thereby preventing the speaker from being fully blocked when lying on a flat surface. However, having a rounded back allows the device to pitch on the surface.

There is a need for a speaker arrangement for communication devices which addresses deficiencies in the prior art.

SUMMARY

In a first aspect, an enclosure for a speaker for a communication device is provided. The enclosure comprises: a surface; a speaker grill located in the surface, the grill having an opening therein providing an air channel to the speaker; and at least one structure located in a first region in the surface and protruding from the surface. The enclosure is shaped such that when the enclosure is placed on a flat surface with the surface facing the flat surface, the structure causes the surface to be canted from the flat surface to expose the speaker grill to ambient air.

In the enclosure, the structure may comprise two structures located in a symmetrical pattern about the speaker grill. When the enclosure is placed on the flat surface, the surface is canted from the flat surface by interaction of the two structures and a second region on the surface.

In the enclosure, the surface may be on a back side of the enclosure.

In the enclosure, the first region may be detachable from the surface.

In the enclosure, the speaker grill may be located in the first region.

In the enclosure, the first region may comprise a central portion, a left flange extending from its left side and a right flange extending from its right side. Further, the two structures may comprise a first elevation located in the left flange and the central portion and a second elevation located in the right flange and the central portion.

In the enclosure the first region further may comprise at least one bottom flange extending from a bottom side of the central portion.

In the enclosure, each of the elevations may have a downward taper for its height as it extends downward along the central portion.

In a second aspect, an enclosure system for a speaker for a communication device is provided. The enclosure system comprises: a back casing having a surface with an opening defined therein providing access to the speaker; and a cover dimensioned to fit snugly over the opening. The cover has: a second surface; a speaker grill located in the second surface and having a second opening in the second surface providing an air channel to the speaker; and at least one structure located on the second surface and protruding from the second surface. In the system, when the cover is fitted to the opening and when the enclosure system is placed on flat surface, the structure causes the back casing to be canted relative to the flat surface to expose the speaker grill to ambient air.

In the system, the back casing may further comprise a recessed flange located beside the opening and a fastener hole for receiving a fastener. Also, the cover may be dimensioned to fit over the recessed flange.

In the system, the structure may comprise two structures located in a symmetrical pattern about the speaker grill. Further, when the enclosure is placed on the flat surface, the speaker grill is canted from the flat surface by interaction of the two structures and another region on the surface.

In the system, the cover may further comprise: a central portion; a left flange extending from its left side; and a right flange extending from its right side. Further, the two structures may comprise: a first elevation located in the left flange and the central portion; and a second elevation located in the right flange and the central portion.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

Figure 1:
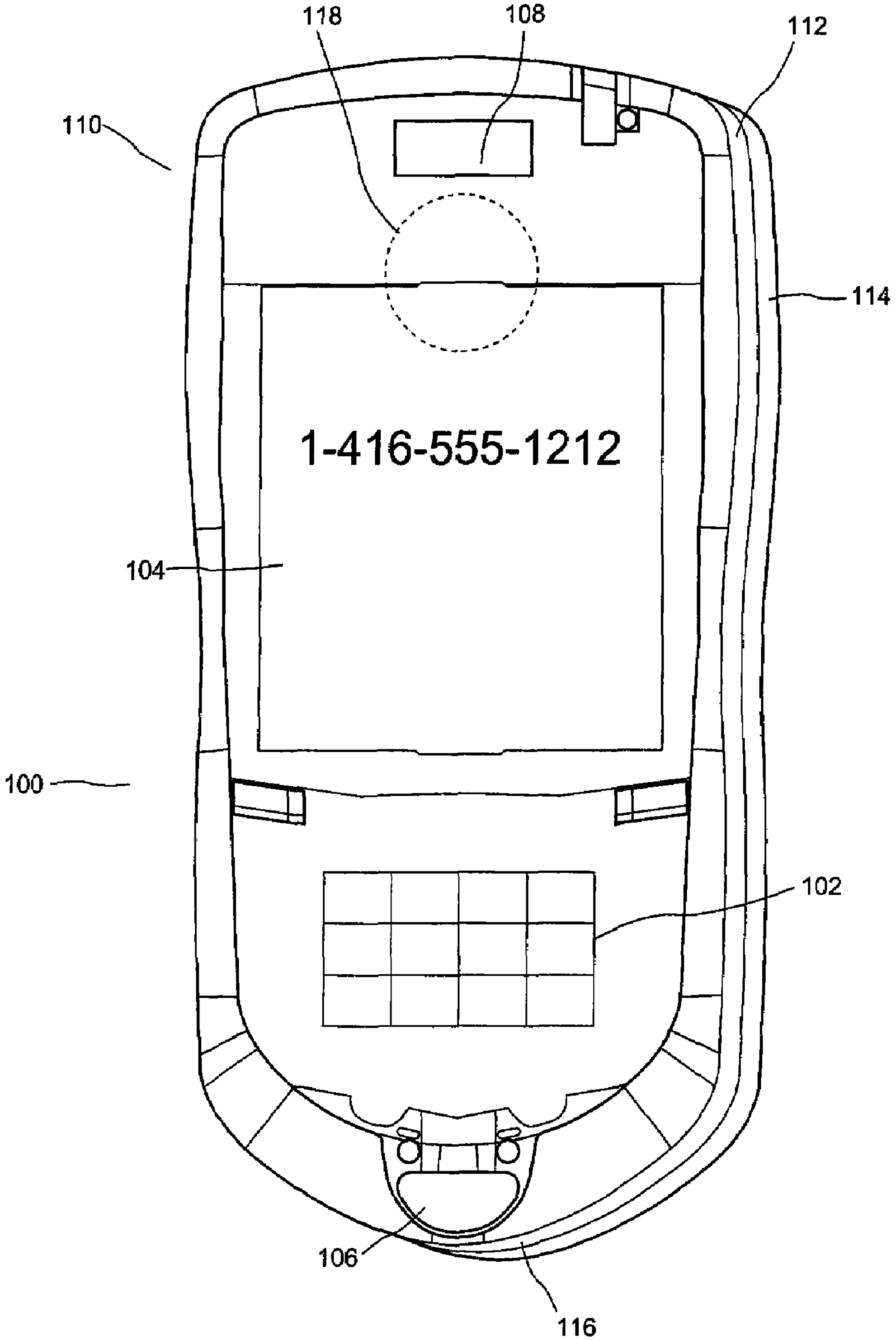
FIG. 1 is a top perspective diagram of a communication device associated with an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Referring to FIG. 1, communication device 100 is shown. In the embodiment, communication device provides voice communications with other devices, allowing its user to hear audio signals (e.g. voices) transmitted from another device (e.g. a cellular phone). Device 100 may be a telephone, a cordless telephone, a cellular telephone, a voice-enabled personal digital assistant (PDA) or any other voice communication device. Communications may be provided via wireless systems, wired systems or a combination of both systems. As is common with voice communication devices, device 100 has a keypad 102, display 104, microphone 106 and transducer 108, i.e. speaker 108. On the back of device 100 is an additional speaker (not shown). For device 100, casing 110 provides an enclosure for its internal circuits and mechanical structures. Casing 110 includes top cover 112 and bottom cover 114 and is made from a plastic injection moulded process. Top cover 112 and bottom cover 114 meet to define an exterior perimeter of device 100 along side 116. Casing 110 may be formed from any suitable material, such as plastic and metal, or any combination of both. General internal circuits and operations of device 100 are well known in the art and are not provided here.

Device 100 provides voice communications for a user with a familiar interface. To initiate a call, the user activates device 100, enters a telephone number to be called on keypad 102 and initiates the call. After the call is connected, the user places device 100 about his mouth and one of his ears, such that microphone 106 is near his mouth and speaker 108 is near his ear. User speaks towards microphone 106 and listens for audio signals from the called party through speaker 108. Device 100 may have an external control to adjust the volume control for audio signals generated by speaker 108.

It is possible to use device 100 in a hands-free mode, by increasing the volume of sound for speaker 108. As such, the user can operate device 100 without requiring him to place device 100 and speaker 108 near his ear. Now, device 100 may be held by user in front of him, such that he can see the front of device 100 while still being able to hear received audio signals. When device 100 is held in such a position, the user may be able to simultaneously hear the received audio signals, operate keypad 102 to provide commands to device 100 and see information on display 104.

Device 100 provides an alternate hands-free mode of operation. Therein, speaker 118 is also provided on device 100. Preferably, speaker 118 is a larger transducer than speaker 108 and is generally able to produce audio signals through a wider frequency range and at higher volume levels than speaker 108. However, in other embodiments, other speakers may be used. As the front spaces of device 100 are largely occupied by keypad 102, display 104, microphone 106 and speaker 108, speaker 118 is located on the back of device 100. In other embodiments, speaker 118 may be placed on the front, top, bottom or a side of the device. In this hand-free mode, device 100 activates speaker 118 and provides an audio signal to speaker 118 to reproduce the received audio signals at a volume level which is sufficient to be heard by the user when device 100 is located in front of him.

Referring to FIGS. 2, 3, 4, 5 and 6, aspects of bottom cover 114 of device 100 are shown. Bottom cover 114 has an oblong-shaped surface 202 and side 204. Surface 202 is almost flat, having a slight convex shape to it. Side 204 defines a lower portion of exterior side 116 of device 100. Side 204 is rounded to provide a softer contour to bottom cover 114. In other embodiments, the back may be flat. Speaker 118 is located in the top portion of bottom cover 114. For assembly and manufacturing reasons, bottom cover 114 is made in two pieces: back casing 206 and back cover 208.

Back casing 206 provides a lower portion of bottom cover 114 and side 204. In a top portion of bottom cover 114, back casing 206 has opening 209, wherein speaker 118 is located inside device 100. Along two sides of opening 209, back casing 206 has flanges 211 that extend from the sides of back casing 206 toward opening 209. Flanges 211 are located at the sides of the opening and protrude from the internal upper surface of back casing 206. Flanges 211 contain screw holes 213 for locating securing screws (or any other equivalent fastener) which lock back casing 206 to internal structural components of device 100 (not shown).

Back cover 208 has base portion 210 and rails 212. Base portion 210 is shaped to be almost flat and fits snugly over the opening to cover it fully and to abut against an edge defined by the boundary of the opening and back casing 206. Base portion 210 has a thickness which allows it to cover the opening and flanges 211 and provide the appearance of a continual surface (but for the boundary defining the perimeter of the opening) for bottom cover 114. Base portion 210 has a center portion 214, side flanges 216 and bottom flanges 218. Extending below bottom flanges 218 are alignment flanges 220 which are mateable into openings 222 of back casing 206 to provide a friction fit between cover 208 and casing 206. In base portion 210, grill section 224 is located around its middle and provides an opening as a set of lateral slots 226. In the embodiment, grill section 224 is slightly recessed below the surface of base portion 210. When base portion 210 is fitted into the opening, in grill 224 lateral slots are located near speaker 118, allowing any sound generated therefrom to pass through them into the ambient environment of device 100. Other shapes and sizes of slots may also be used. In other embodiments, grill section 224 may not be recessed. In one embodiment, grill section 224 is integrated into base portion 210. In another embodiment, grill section 224 is removeable from base portion 210. Back cover 208 may be injected moulded plastic. The durability of the material of back cover 208 can depend on its intended operating environment.

Figure 2:
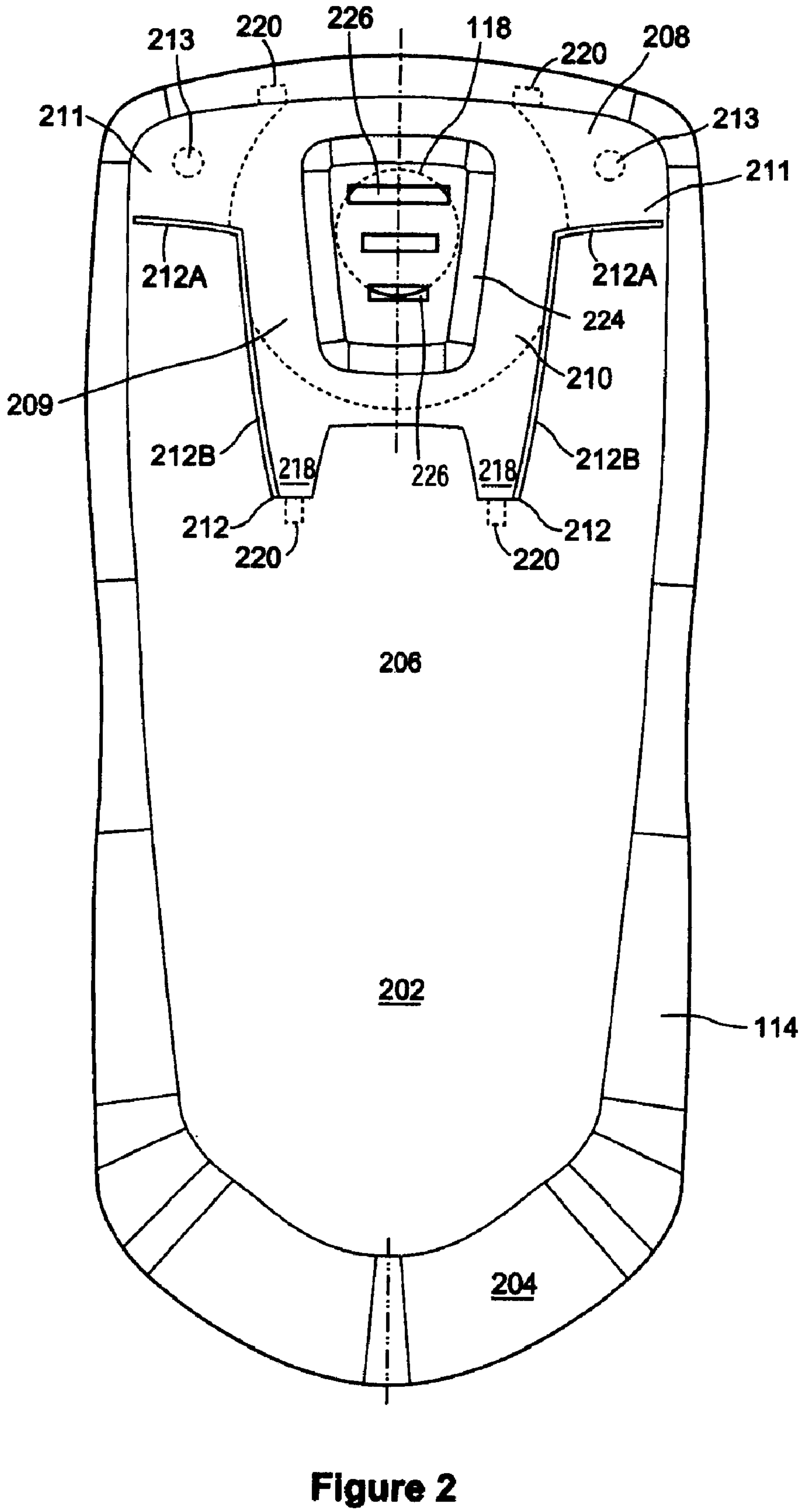
FIG. 2 is a rear view of the communication device of FIG. 1.
Figure 3:
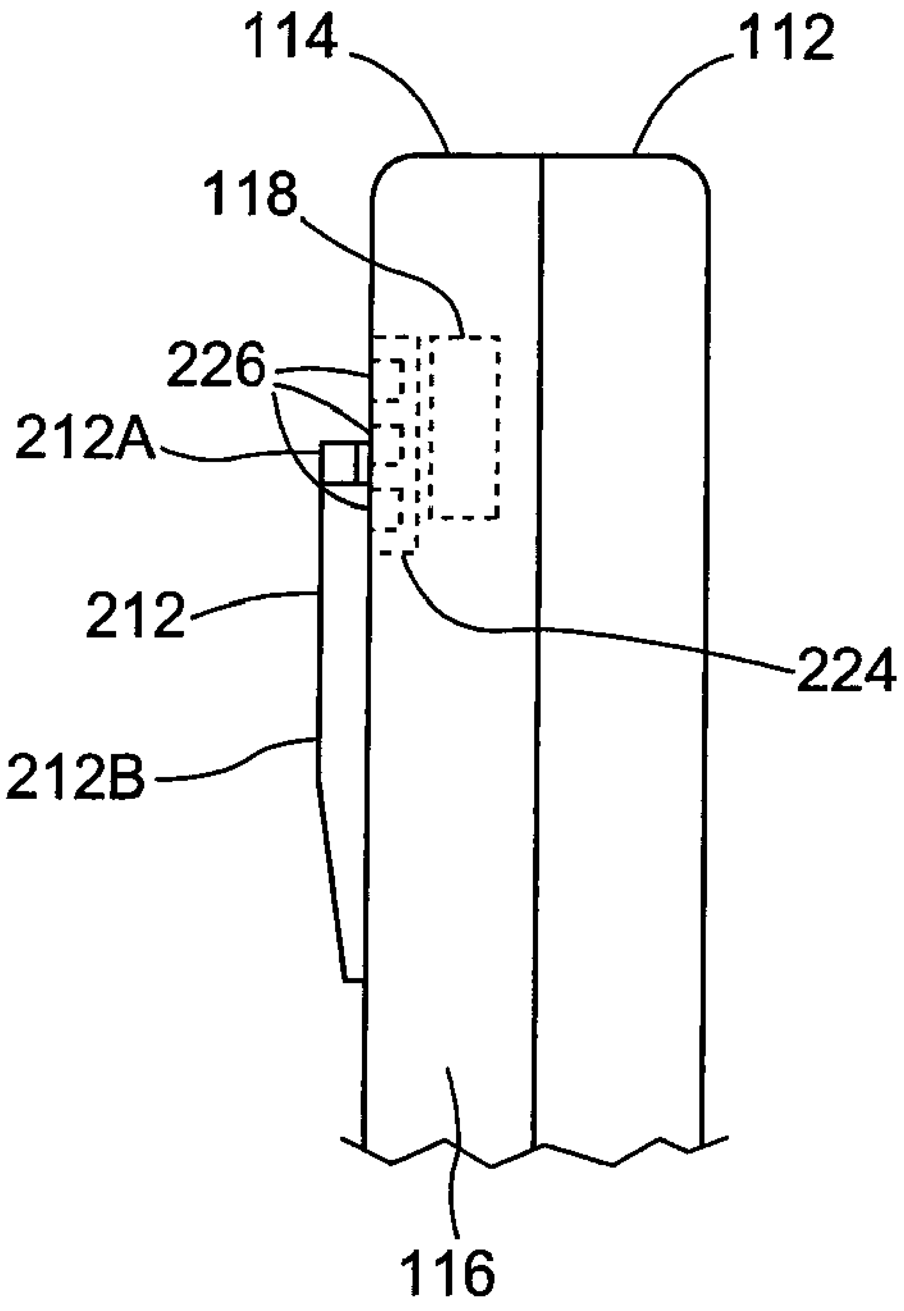
FIG. 3 is a side view of part of the communication device of FIG. 1.
Figure 4:
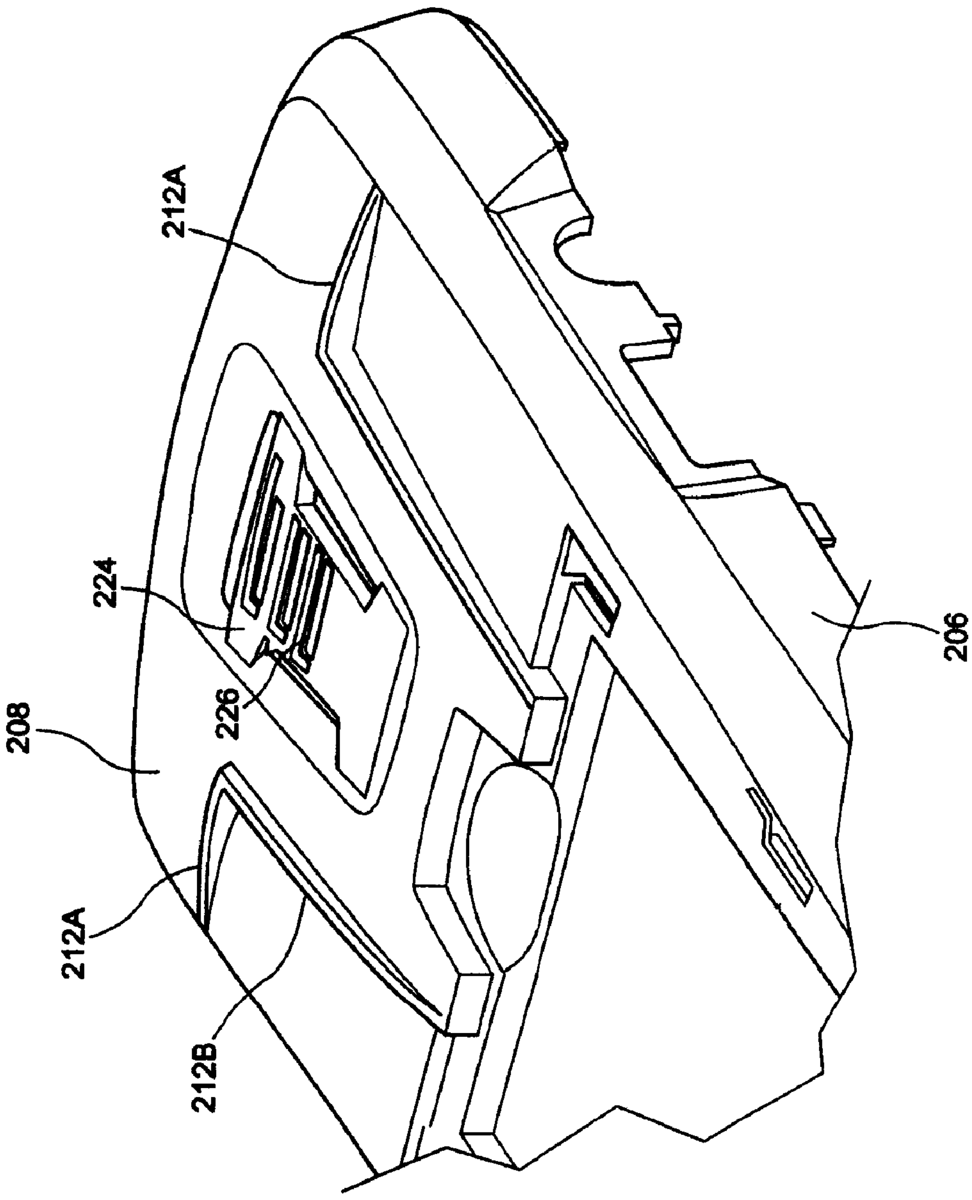
FIG. 4 is a rear perspective view of part of a bottom cover of the device of FIG. 1.
Figure 6:
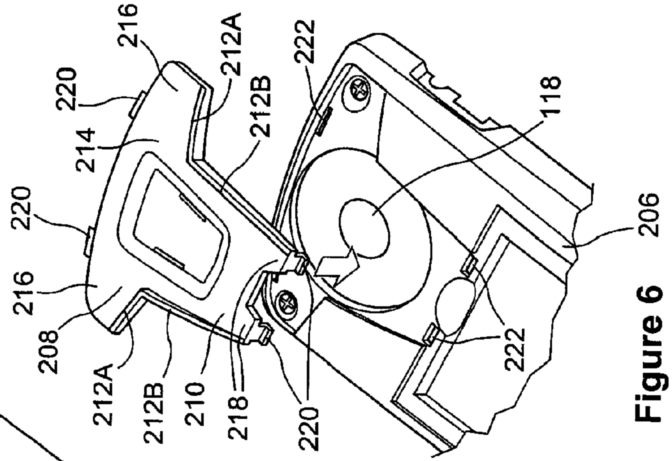
FIG. 6 is a rear perspective view of part of the back casing and a back cover of the communication device as shown in FIGS. 1, 4 and 5.
Figure 5:
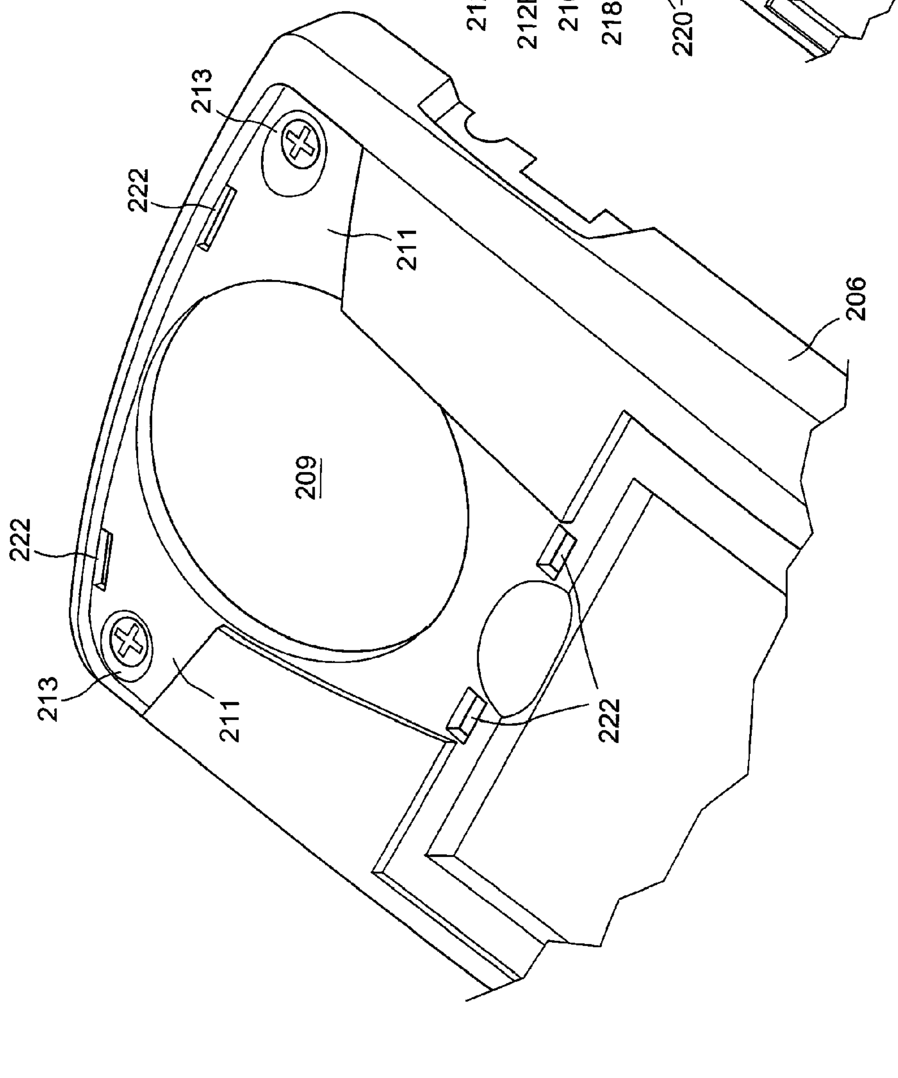
FIG. 5 is a rear perspective view of part of a back casing of the device of FIG. 1.

There are two rails 212 located in a symmetric pattern about edges of base portion 210. Each rail 212 comprises two sections: rail 212A and rail 212B. Each rail 212A is located along the lower edge of a side flange 216. Each rail 212B is connected to its corresponding rail 212A and runs from the top of the exterior side of both base portion 210 and its neighbouring bottom flange 218. Rails 212 are relatively thin volumes having a rectanguloid (i.e., generally rectangular) cross-section. Preferably, rails 212 extend approximately 1 mm downward from base portion 210. However, the height of a rail 212 may change through its length. Both rails 212A and 212B are shown as having a higher height near the center of base portion 210 and then a tapering height as they progress outwardly therefrom. It will be appreciated that the height of rails in other embodiments can be set to almost any value, if aesthetics are disregarded. As FIG. 2 shows, rails 212 are located near grill section 224. Rails 212 preferably are the only significant outwardly extending feature present on back 214. This provides a clean appearance to back 214. Rails 212 may be made from a pliable form of plastic or rubber, thereby providing some shock absorption and resistance to movement when casing 206 is rested on a hard surface. In other embodiments any shaped extension, feature or protrusion which extends from the case could be suitable.

When device 100 is placed on an almost flat surface with bottom cover 114 facing the surface, there are three points of contact for device 100 to the surface: each of rails 212 and a line of contact in the lower portion of back casing 206. Each of rails 212 defines a first region of contact with the flat surface and the line of contact defines a second region of contact. Collectively, three points of contact provide a stable, non-tipping platform. As the top end of bottom cover 114 is elevated from the surface, the plane of bottom cover 114 is not coplanar with the plane of the surface. As such, grill section 224 is canted upward and away from the surface. Accordingly, speaker 118 has clearance from the surface and an air channel to the ambient environment is created. As such, audio signals can be emitted through the air channel created by the cant between bottom cover 114 and the surface. In other embodiments, the points of contact may only be the rails, provided they have sufficient length and height to support device 100.

Figure 7:
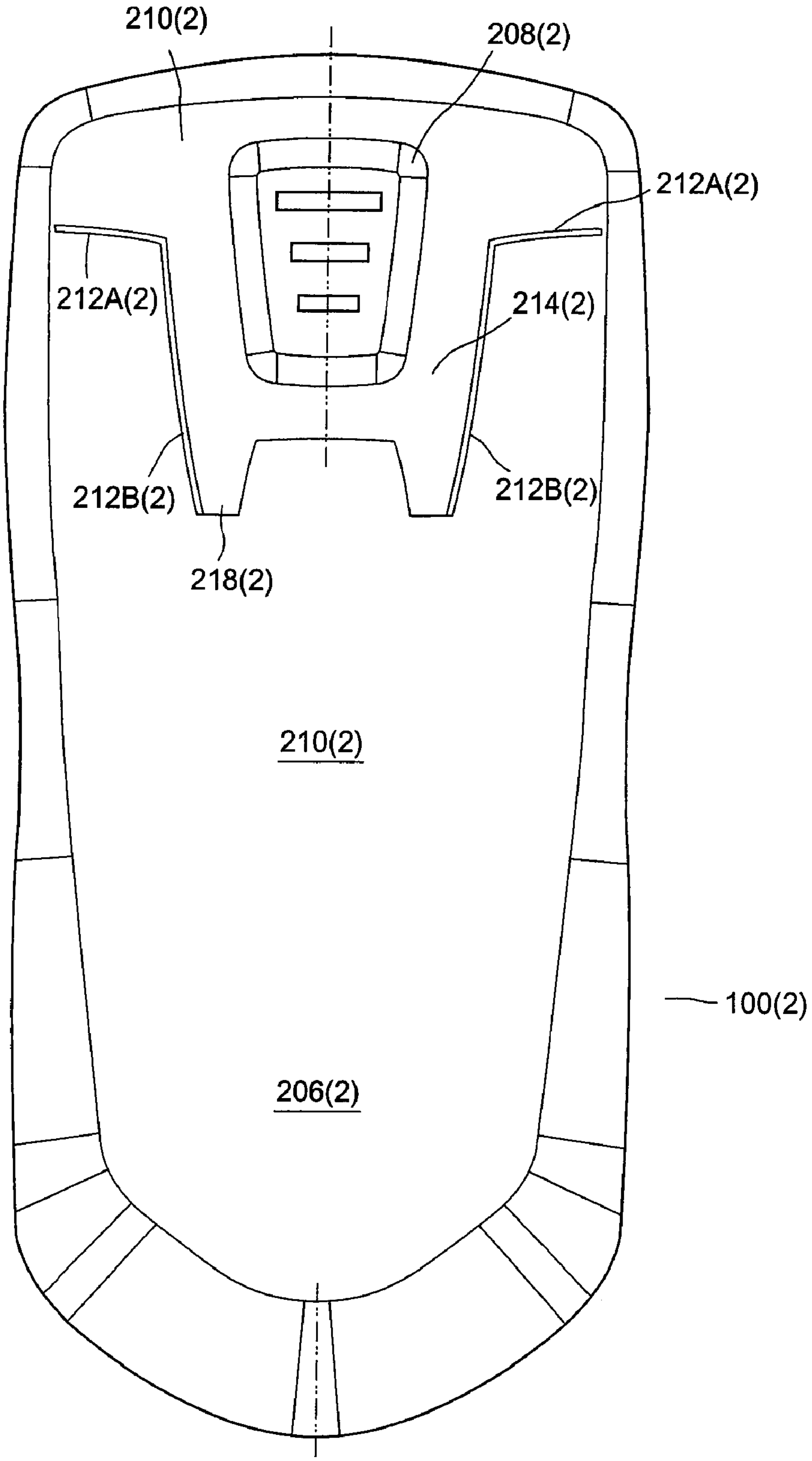
FIG. 7 is a rear view of a second embodiment.
Figure 8:
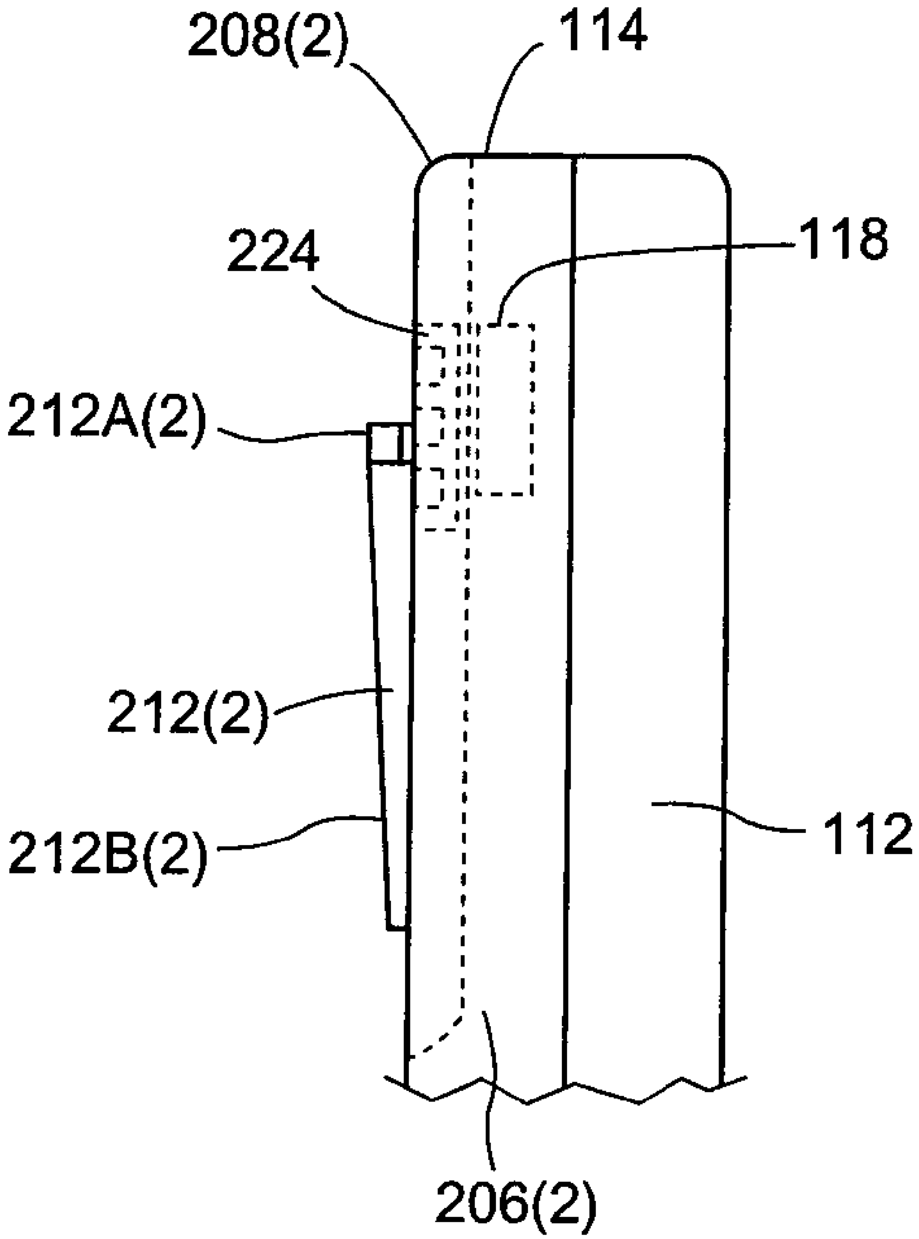
FIG. 8 is a side view of part of the second embodiment.

FIGS. 7 and 8 show another embodiment, wherein back casing 206(2) and base portion 210(2) are dimensionally similar to back casing 206 and base portion 210. Rails 212(2) are located in the same locations on base portion 210(2). However, rails 212A(2) that are located along the sides of central portion 214(2) and bottom flanges 218(2) have a differently tapered height, compared to those in base portion 210, decreasing in height from the of rails 212A(2) in side flanges 216(2), as rails 212A(2) progress downward along bottom cover 114(2). This taper provides more points of contact when device 100(2) is placed on a surface and minimizes the visual prominence of rails 212A(2) on back 214(2).

Figure 9:
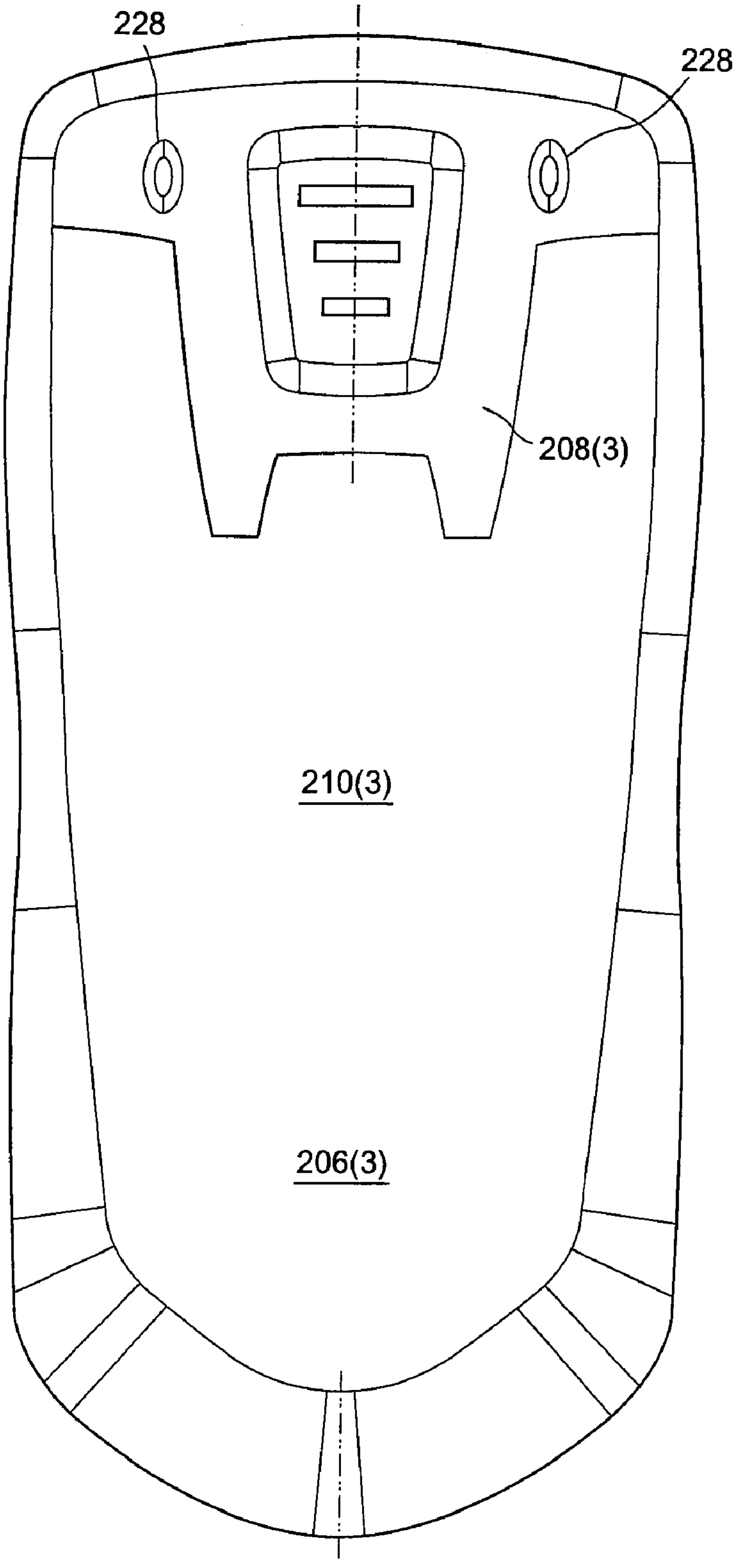
FIG. 9 is a rear view of a third embodiment.
Figure 10:
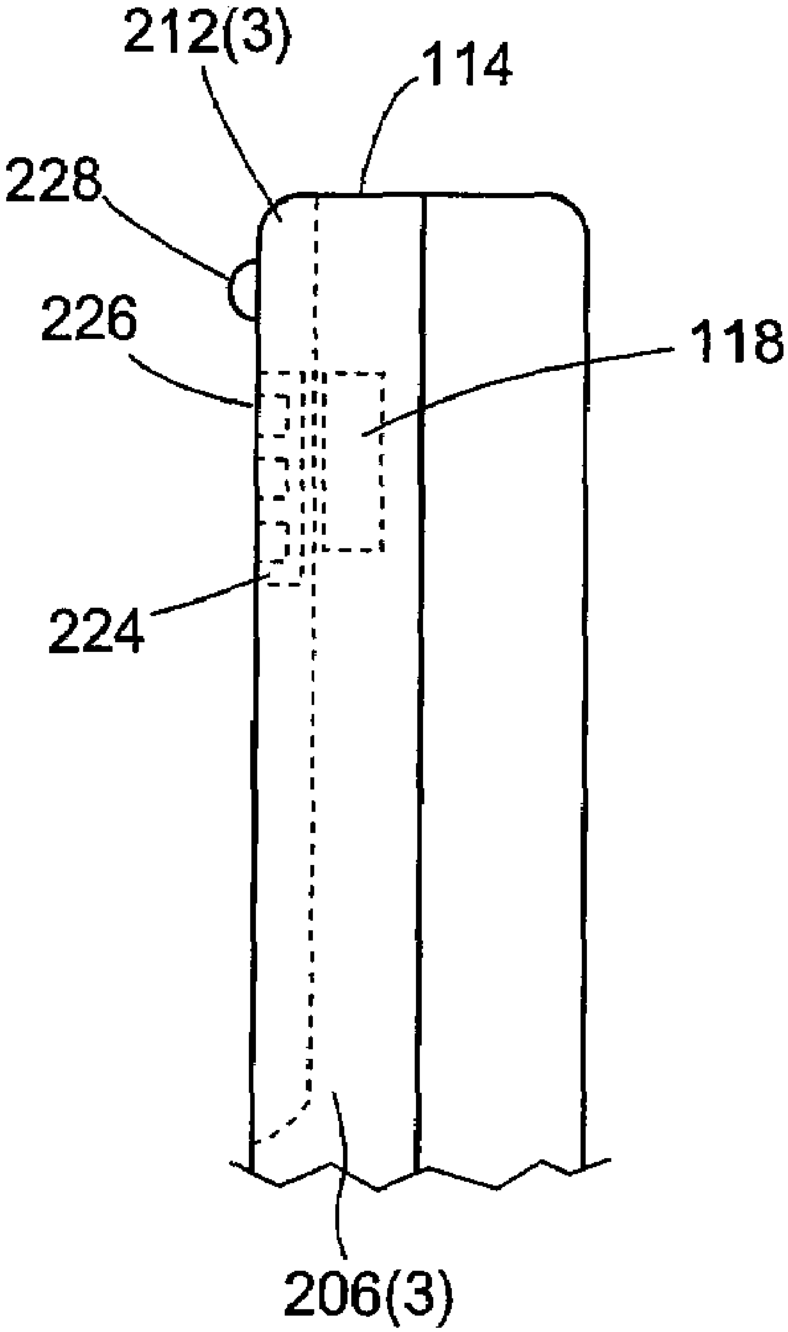
FIG. 10 is a side view of part of the third embodiment.

FIGS. 9 and 10 show another embodiment, wherein back casing 206(3) and base portion 210(3) are dimensionally similar to back casing 206 and base portion 210. Two nubs 228 extend outwardly from an upper region of base portion 210(3) and are located in a symmetrical pattern in view of the grill and the bottom of back casing 206(3). In other embodiments 1, 2, 3 or more nubs may be provided at different locations on back 214. Nubs 228 provide a similar prop to cant back 214B from a surface.

It will be appreciated that covers 208, 208(2) and 208(3) are dimensionally identical regarding the interface to back casing 206. As such, the covers can be interchanged, as needed.

It will be appreciated that an aspect of the embodiment provides a structural means for a case of a communication device to be canted from a surface thereby allowing a speaker located in the case to be exposed to ambient air. Ambient air accesses the speaker through a speaker grill in the case, where the grill has a series of openings therein. Accordingly, in other embodiments, rails on the back may be placed towards an opposite end of the location of the larger speaker. Alternatively, the rails or nub may be placed on the back casing. Further, the structural means may be any shaped structural element(s) protruding from the case to appropriately cant the case to expose it to ambient air. For example, other structural elements may be disks, domes, bumps, blocks or the like. Alternatively still, the back casing may be a single piece with cover integrated into the back casing as one piece.

Although the invention has been described with reference to certain specific embodiments, various modifications thereof will be apparent to those skilled in the art without departing from the scope of the invention as outlined in the claims appended hereto.

We claim:

1. An enclosure for a speaker for a communication device, said enclosure comprising:
- a casing for said communication device, said casing having a back side and a casing opening in said back side;
- a speaker mounted inside said casing and in communication with said casing opening; and
- a cover shaped to mate with and to cover said casing opening, said cover having
  - a central portion, a left flange extending from a left side of said central portion and a right flange extending from a right side of said central portion;
  - a first rail protruding outwardly from a surface of said cover and located along an edge of said left flange and in said central portion;
  - a second rail protruding outwardly from said surface and located along an edge of said right flange and in said central portion; and
  - a speaker grill having an opening therein providing an air channel for said speaker, wherein
- said first and said second rails are located about said speaker grill in a symmetrical pattern; and
- when said communication device is placed on a flat surface with said side of said casing facing said flat surface, said first and second rails cause said back side of said casing to be canted from said flat surface to expose said speaker grill to ambient air.

2. The enclosure for a speaker for a communication device as claimed in claim 1, wherein said speaker grill is detachable from said cover.

3. The enclosure for a speaker for a communication device as claimed in claim 1, wherein said cover further comprises at least one bottom flange extending from a bottom side of said central portion.

4. The enclosure for a speaker for a communication device as claimed in claim 3, wherein
- said first rail has a downward taper for its height as it extends along said central portion; and
- said second rail has a downward taper for its height as it extends along its central portion.

5. The enclosure system for a speaker for a communication device as claimed in claim 3, wherein a middle of said cover aligns with a longitudinal axis of said back casing.

6. An enclosure system for a speaker for a communication device, said enclosure system comprising:
- a back casing having a surface with an opening defined therein providing access to said speaker, a recessed flange located beside said opening and a fastener hole for receiving a fastener; and
- a cover dimensioned to fit snugly over said opening and said recessed flange, said cover having
  - a second surface;
  - a speaker grill located in said second surface and having a second opening in said second surface providing an air channel to said speaker;
  - a central portion, a left flange extending from a left side of said central portion and a right flange extending from a right side of said central portion;
  - a first rail protruding from said second surface and located in said left flange and said central portion; and a second rail protruding from said second surface and located in said right flange and said central portion, wherein said first and second rails are located symmetrically about said second opening; and when said cover is fitted to said opening and when said enclosure system is placed on flat surface, said first and second rails cause said back casing to be canted relative to said flat surface to expose said speaker grill to ambient air.

7. The enclosure system for a speaker for a communication device as claimed in claim 6, wherein a middle of said cover aligns with a longitudinal axis of said back casing.

* * * * *